United States Patent
Qualls et al.

(10) Patent No.: US 12,006,478 B2
(45) Date of Patent: Jun. 11, 2024

(54) CONTAMINANT REMOVAL WITH CATALYST BEDS FOR LNG PROCESSING

(71) Applicant: ConocoPhillips Company, Houston, TX (US)

(72) Inventors: Wesley R. Qualls, Houston, TX (US); Christopher M. Widner, Houston, TX (US); Peter N. Slater, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 17/747,614

(22) Filed: May 18, 2022

(65) Prior Publication Data

US 2022/0372379 A1     Nov. 24, 2022

Related U.S. Application Data

(60) Provisional application No. 63/302,423, filed on Jan. 24, 2022, provisional application No. 63/190,155, filed on May 18, 2021.

(51) Int. Cl.
    *C10G 25/05*     (2006.01)
    *B01J 20/02*     (2006.01)
    (Continued)

(52) U.S. Cl.
    CPC .......... *C10G 25/05* (2013.01); *B01J 20/0285* (2013.01); *B01J 20/06* (2013.01); *B01J 20/324* (2013.01);
    (Continued)

(58) Field of Classification Search
    CPC .................. C10G 25/003; C10G 25/05; C10G 2300/1025; B01J 20/0283; B01J 20/324; B01J 2220/56
    See application file for complete search history.

(56) References Cited

U.S. PATENT DOCUMENTS 5,330,560 A     7/1994    Chao et al.
6,631,626 B1    10/2003    Hahn
                    (Continued)

FOREIGN PATENT DOCUMENTS

GB             2406294 A   *   3/2005  ............. B01D 24/00
WO     WO-2016168731 A1   *   10/2016  ........... C10G 25/003

OTHER PUBLICATIONS

Qualls, W.R. et al., 2011, A Tale of Two Sieves, GasTech 2011, ConocoPhillips Company, 10 pp. (Year: 2011).*

(Continued)

*Primary Examiner* — Brian A McCaig
(74) *Attorney, Agent, or Firm* — Polsinelli PC

(57) ABSTRACT

Disclosed are systems and methods for processing liquefied natural gas (LNG). A LNG production system may include a contaminant removal process with one or more sets of sorbent beds co-loaded with a metal sulfide sorbent and/or metal oxide sorbent. In some examples, the contaminant removal process may include one or more molecular sieve dehydrators co-loaded with a 3A or 4A sieve and a 3A or 4A sieve impregnated with silver. The one or more sets of sorbent beds may be arranged at various locations throughout the LNG production system including upstream of or downstream of heavy component removal beds having activated carbon. In some instances, the LNG production system may include a regeneration process for moving heated fluid, typically feed gas, through a first heavy component removal bed while maintaining other heavy component removal beds online to reduce downtime for the LNG production system, increase production efficiency, and decrease an amount of greenhouse gases released from defrost and flare-offs.

18 Claims, 9 Drawing Sheets

(51) Int. Cl.
   *B01J 20/06*   (2006.01)
   *B01J 20/32*   (2006.01)
   *C10G 25/00*   (2006.01)

(52) U.S. Cl.
   CPC ......... *C10G 25/003* (2013.01); *B01J 2220/56* (2013.01); *C10G 2300/1025* (2013.01)

(56) References Cited

U.S. PATENT DOCUMENTS

| | | |
|---|---|---|
| 10,486,099 B2 | 11/2019 | Marshall, IV et al. |
| 2007/0122327 A1 | 5/2007 | Yang et al. |
| 2010/0121126 A1 | 5/2010 | Northrop et al. |
| 2020/0080771 A1 | 3/2020 | Cooper |
| 2020/0124345 A1 | 4/2020 | Christensen et al. |

OTHER PUBLICATIONS

International Search Report and Written Opinion for International Application No. PCT/US2022/029822 dated Aug. 15, 2022 (8 pages).

\* cited by examiner

1

CONTAMINANT REMOVAL WITH CATALYST BEDS FOR LNG PROCESSING

CROSS-REFERENCE TO RELATED APPLICATIONS

The present application claims priority to U.S. Provisional Patent Application No. 63/302,423, entitled "Contaminant Removal with Sorbent Beds for LNG Processing" and filed on Jan. 24, 2022, and to U.S. Provisional Patent Application No. 63/190,155, entitled "Contaminant Removal with Sorbent Beds for LNG Processing" and filed on May 18, 2021. Each of these applications is specifically incorporated by reference in its entirety herein.

TECHNICAL FIELD

Aspects the present disclosure relate generally to systems and methods for liquefaction of natural gas and more particularly to removing contaminants during processing of liquefied natural gas (LNG) using sorbent beds.

BACKGROUND

Natural gas is a commonly used resource comprised of a mixture of naturally occurring hydrocarbon gases typically found in deep underground natural rock formations or other hydrocarbon reservoirs. More particularly, natural gas is primarily comprised of methane and often includes other components, such as, ethane, propane, carbon dioxide, nitrogen, hydrogen sulfide, and/or the like.

Cryogenic liquefaction generally converts the natural gas into a convenient form for transportation and storage. More particularly, under standard atmospheric conditions, natural gas exists in vapor phase and is subjected to certain thermodynamic processes to produce LNG. Liquefying natural gas greatly reduces its specific volume, such that large quantities of natural gas can be economically transported and stored in liquefied form.

Some of the thermodynamic processes generally utilized to produce LNG involve cooling the natural gas to near atmospheric vapor pressure. For example, a natural gas stream may be sequentially passed at an elevated pressure through multiple cooling stages that cool the gas to successively lower temperatures until the liquefaction temperature is reached. Stated differently, the natural gas stream is cooled through indirect heat exchange with one or more refrigerants, such as propane, propylene, ethane, ethylene, methane, nitrogen, carbon dioxide, and/or the like, and expanded to near atmospheric pressure.

During cooling of the processed natural gas stream, trace amounts of intermediate components, such as propanes, butanes, and pentanes, and heavy hydrocarbon components ("heavies"), such as C12 to C16 hydrocarbons, often freeze in downstream systems of in an LNG plant, including heat exchangers. As these components freeze during the cooling process, deposits buildup on internal surfaces of various systems of the LNG plant. Such fouling may result in a shutdown of one or more systems of the LNG plant to defrost and remove the deposits, resulting in a loss of production and an expulsion of greenhouse gases through "flare-offs" that defrost clear out excess natural gas from the system prior to cleaning. Additional metallic and organometallic contaminants may further cause aggressive corrosion and/or fouling within the LNG plant and may cause the liquified natural gas product or fractions of the natural gas sold as other products to not meet purity standards for pipeline transportation and/or liquefaction. As examples, mercury and organometallic mercury compounds may result in aggressive aluminum exchangers and piping corrosion and the organometallic trimethylarsine compound may freeze in equipment within a typical LNG facility. Metallic and organometallic contaminants are difficult to remove in conjunction with also removing trace heavy hydrocarbon components without causing downtime for the LNG plant.

It is with these observations in mind, among others, that various aspects of the present disclosure were conceived and developed.

SUMMARY

Implementations described and claimed herein address the foregoing problems by providing systems and methods for processing liquefied natural gas (LNG). In one implementation, a natural feed gas is received and processed by various heating, cooling, condensing, and filtering components of an LNG production system. The filtering components may include one or more sets of metallic and organometallic component sorbent beds, molecular sieve dehydrators to remove moisture, and/or heavy hydrocarbon component removal beds. The one or more set of sorbent beds may include a metal sulfide sorbent and/or a metal oxide sorbent. The metal sulfide sorbent may cause chemical adsorption and removal of mercury and mercury compounds from the natural gas feed and the metal oxide sorbent may cause physical adsorption and removal of arsenic and arsenic compounds from the natural gas feed. A silver impregnated sieve in the one or more molecular sieve dehydrators may also remove metallic and organometallic compounds. In some instances, the metal sulfide sorbent and/or the metal oxide sorbent may be combined and included in the heavy compound removal beds. Additionally, the LNG production system may include a regeneration process to take one or more heavy hydrocarbon sorbent beds offline to regenerate or remove the heavy hydrocarbons, while maintaining the remaining sorbent beds in operation.

Furthermore, in some examples, a method for removing contaminants during liquid natural gas processing comprises: co-loading a set of sorbent beds with a metal sulfide sorbent and a metal oxide sorbent; introducing a natural gas feed into the set of sorbent beds; creating a filtered natural gas feed by: filtering, using the metal sulfide sorbent and the metal oxide sorbent, first contaminants from the natural gas feed; and filtering, using activated carbon, second contaminants from the natural gas feed; and outputting the filtered natural gas feed.

As such, the LNG production system may improve contaminant removal and production efficiency by improving onstream time, leading to higher production, while also reducing greenhouse gas emissions emitted during plant outages to defrost and remove frozen hydrocarbons to flare.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
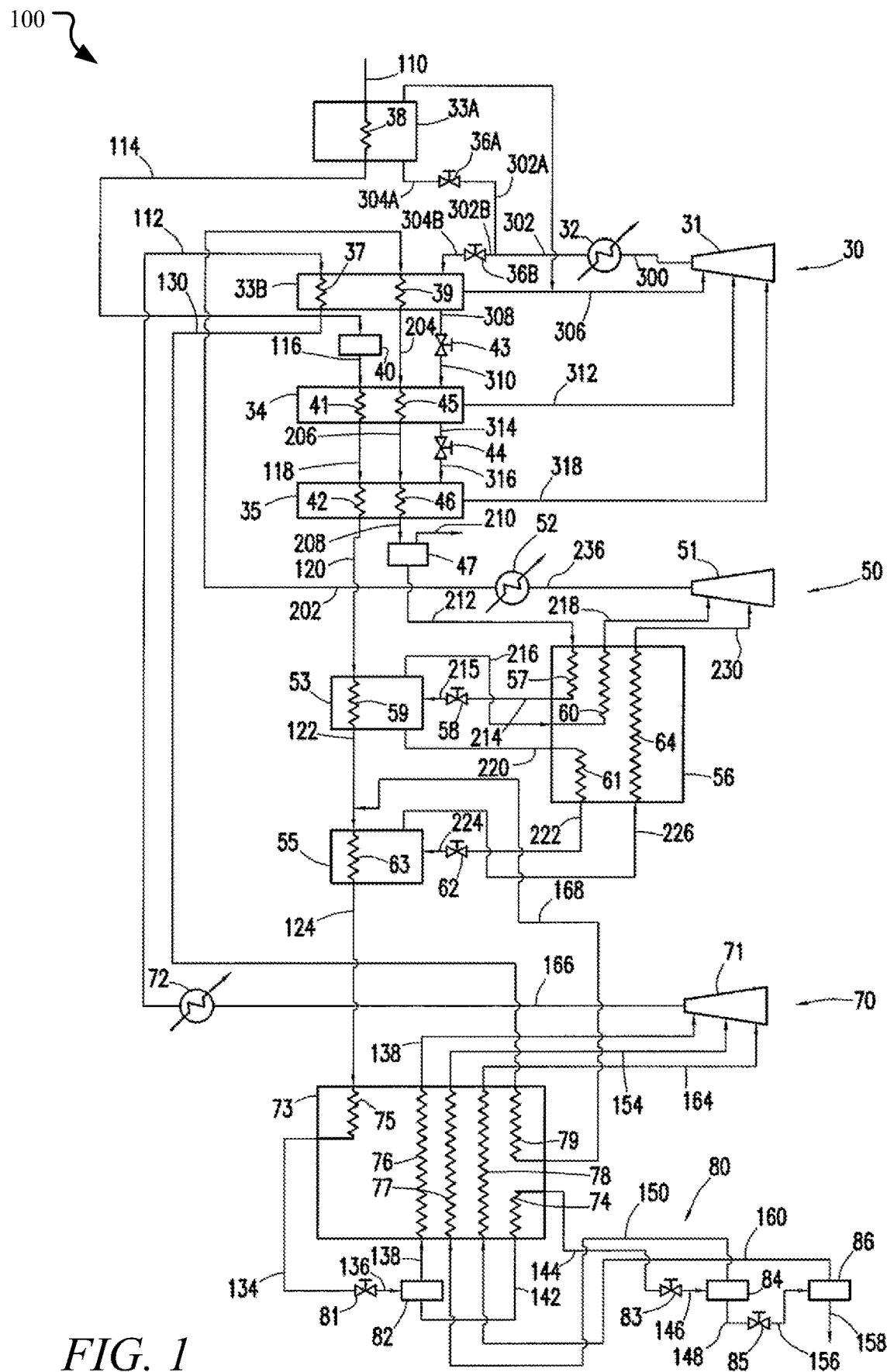
FIG. 1 illustrates an example simplified flow diagram of a cascade refrigeration process with for removing contaminants during LNG production.

Aspects of the present disclosure involve systems and methods for removing contaminants from a natural gas feed. In general, LNG plant feedstocks often contain freezing components, such as heavy hydrocarbon components "heavies" that form solids at the cold and cryogenic temperatures associated with the natural gas liquefaction process. Even trace concentrations of such heavies can freeze prior to and during liquefaction. Accordingly, unless such heavies are sufficiently removed, solids may form and deposit on process equipment in cold sections of the plant, thereby hindering plant operation and LNG production. Trace heavy hydrocarbon components in otherwise lean feed gas compositions with relatively few intermediate components are particularly difficult to remove. Moreover, the feedstocks may also contain elemental, ionic and/or organometallic mercury, mercury compounds, arsenic, and/or arsenic compounds.

In some examples, an LNG production system may include a contaminant removal process for removing the elemental, ionic or organometallic mercury, mercury compounds, arsenic, and/or arsenic compounds in addition to the heavy hydrocarbon components with little or no system downtime. The contaminant removal process may send the natural gas feed to a set of sorbent beds co-loaded with a metal sulfide sorbent and a metal oxide sorbent. The metal sulfide sorbent may adsorb and remove mercury and mercury compounds from a natural gas feed while the metal oxide sorbent may adsorb and remove the arsenic and arsenic compounds as the gas flows through the sorbent beds. The metal sulfide sorbent and the metal oxide sorbent may be mixed together to form a mixed sorbent bed, and/or the metal sulfide sorbent may form a first layer and the metal oxide sorbent may form a second layer within the same sorbent beds. The heavy hydrocarbon components may be removed by activated or sulfur impregnated carbon, which may be co-loaded in the set of sorbent beds with the metal sulfide sorbent and the metal oxide sorbent, may be loaded into a second set of sorbent beds, for instance, downstream from a first set of sorbent beds, and/or may be co-loaded into a set of heavy component removal beds. The set or sets of sorbent beds may be arranged at various locations throughout the feed pretreatment system as well as within the LNG production system, at different stages of processing. Moreover, the contaminant removal processes may include multiple sets of sorbent beds including the metal sulfide sorbent and/or the metal oxide sorbent.

In some examples, the LNG production system may include a regeneration process for regenerating the one or more heavy component removal beds. For instance, multiple heavy compound removal beds may be arranged in parallel for filtering heavy components from the natural gas. A first heavy component removal bed may be isolated from the other heavy compound removal beds (e.g., via manually operated or automated sequence valves) and heated using a gas or liquid to remove some or most of the adsorbed heavy hydrocarbon components. The heated gas of liquid, typically treated feed gas, may remove heavy hydrocarbon components that adsorbed while leaving any adsorbed mercury or organometallic mercury components. Meanwhile, the other heavy component removal beds may remain online filtering the natural gas. Once the first heavy compound removal bed has been cleared of heavy hydrocarbon contaminants (e.g., after being "regenerated"), the first heavy component removal bed may be cooled and brought back online to continue filtering the natural gas, while another heavy component removal bed is isolated to undergo the same regeneration and cooling process. Because at least one heavy compound removal bed may be operating during the regeneration process, the LNG production system does not experience downtime during the regeneration process. As such, the LNG production system may improve production efficiency due to higher onstream time while reducing an amount of greenhouse gases emitted due to defrosts and flare-offs which are typically required to clear frozen hydrocarbons and any organometallic arsenic compounds.

In some examples, the sorbents may be removed and regenerated at a central regeneration facility. An operator may remove the bed when a certain time and/or performance decrease is observed. The bed material may be transferred to the regeneration facility operated either by the operator or a third party, and the bed may be replaced with a regenerated bed.

Figure 2:
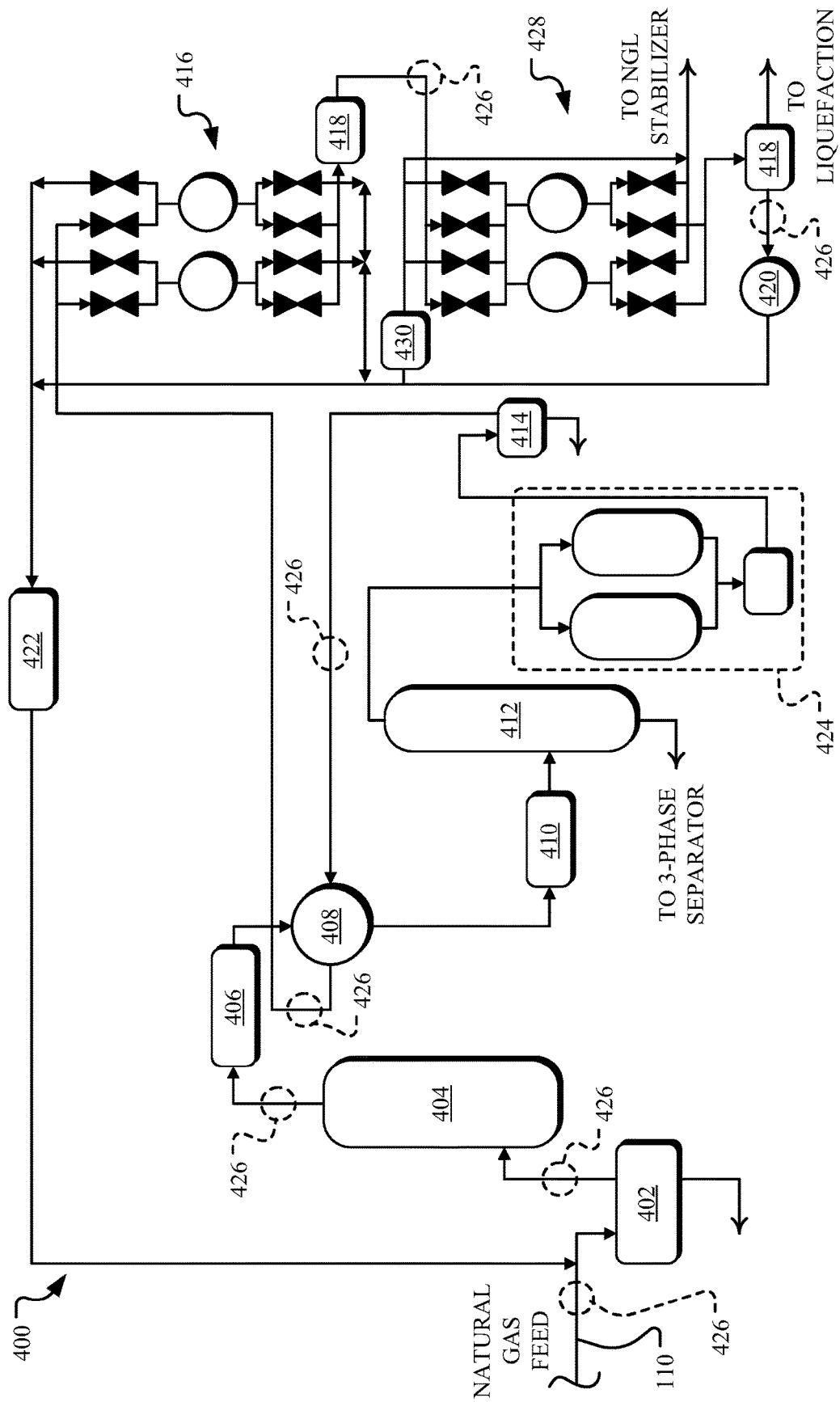
FIG. 2 illustrates an example LNG production system with a process for removing contaminants during LNG production.

The contaminant removal process of the presently disclosed technology thus provides a flexible process for removing freezing organometallic mercury and arsenic compounds as well as heavy hydrocarbon components, from a natural gas stream, as described with respect to FIG. 2. The contaminant removal process may be deployed in front of or integrated within a liquefaction process to prevent solids deposition, thereby providing design and operation flexibility operable for a wide range of natural gas compositions, pipeline compositional variations, and LNG architectures.

The presently disclosed technology thus reliably eliminates contaminants leading to freezing or aggressive corrosion in chilling and liquefaction areas of the LNG train by removing heavy components, organometallic and/or ionic mercury and arsenic compounds, thereby improving LNG production, operational flexibility, and independence, and provides a customizable system that may deployed upstream of or within various LNG train architectures, among other advantages that will be apparent from the present disclosure.

I. Terminology

The liquefaction process described herein may incorporate one or more of several types of cooling systems and methods including, but not limited to, indirect heat exchange, vaporization, and/or expansion or pressure reduction.

Indirect heat exchange, as used herein, refers to a process involving a cooler stream cooling a substance without actual physical contact between the cooler stream and the substance to be cooled. Specific examples of indirect heat exchange include, but are not limited to, heat exchange undergone in a shell-and-tube heat exchanger, a core-in-shell heat exchanger, a spiral wound heat exchanger, a printed circuit heat exchanger and a brazed aluminum plate-fin heat exchanger. The specific physical state of the refrigerant and substance to be cooled can vary depending on demands of the refrigeration system and type of heat exchanger chosen.

Expansion or pressure reduction cooling refers to cooling which occurs when the pressure of a gas, liquid or a two-phase system is decreased by passing through a pressure reduction means. In some implementations, expansion means may be through an expansion valve. In other implementations, the expansion means may be either a liquid, two-phase or gas expander. Expanders recover work energy from the expansion process and achieve lower process stream temperatures upon expansion.

Sorbent throughout the document is used to reference a physical and/or chemical adsorbent material. Within the industry, sorbents are often referenced as catalysts. The choice of the word sorbent is not intended to limit the scope of the invention to preclude any catalytic effects of the materials selected. For example, metal oxide sorbent, metal sulfide sorbent, and/or mercury removal sorbent may also be referenced as metal oxide catalyst, metal sulfide catalyst, and mercury removal catalyst.

In the description, phraseology and terminology are employed for the purpose of description and should not be regarded as limiting. For example, the use of a singular term, such as "a", is not intended as limiting of the number of items. Also, the use of relational terms such as, but not limited to, "down" and "up" or "downstream" and "upstream", are used in the description for clarity in specific reference to the FIGS. and are not intended to be limiting in scope. Further, any one of the features may be used separately or in combination with any other feature. For example, references to the term "implementation" means that the feature or features being referred to are included in at least one aspect of the disclosed subject matter. Separate references to the term "implementation" in this description do not necessarily refer to the same implementation and are also not mutually exclusive unless so stated and/or except as will be readily apparent to those skilled in the art from the description. For example, a feature, structure, process, step, action, or the like described in one implementation may also be included in other implementations, but is not necessarily included. Thus, the disclosed subject matter may include a variety of combinations and/or integrations of the implementations described herein. Additionally, all aspects of the disclosed subject matter as described herein are not essential for its practice.

Lastly, the terms "or" and "and/or" as used herein are to be interpreted as inclusive or meaning any one or any combination. Therefore, "A, B or C" or "A, B and/or C" mean any of the following: "A"; "B"; "C"; "A and B"; "A and C"; "B and C"; or "A, B and C." An exception to this definition will occur only when a combination of elements, functions, steps or acts are in some way inherently mutually exclusive.

II. General Architecture and Operations

Some LNG projects introduce pipelines as a source of feed gas in an LNG Optimized Cascade Process (OCP). The OCP is based on three multi-staged, cascading refrigerant circuits using essentially pure refrigerants, brazed aluminum heat exchangers and insulated cold box modules. Essentially pure refrigerants of propane (or propylene), ethylene, and methane may be utilized.

The Optimized Cascade Process (OCP) may use a two or three-column heavies removal unit (heavies removal unit or HRU) to eliminate C6+ hydrocarbons (i.e. heavy components) from the natural gas prior to condensing the gas to LNG. In the usual case, the gas has already been processed through acid gas removal and dehydration units prior to heavies removal. Heavies removal is done to prevent freezing from occurring in the liquefaction heat exchangers and to moderate the heating value of the LNG. It also prevents off-specification due to increased levels of heavy components. The OCP or the feed pretreatment system upstream of the OCP may also include a contaminant removal process for removing metals, metal compounds, organometallic compounds, and ionic compounds, as discussed in greater detail below regarding FIGS. 2-5.

The presently disclosed technology may be implemented in a cascade LNG system employing a cascade-type refrigeration process using one or more predominately pure component refrigerants. The refrigerants utilized in cascade-type refrigeration processes can have successively lower boiling points to facilitate heat removal from the natural gas stream that is being liquefied. Additionally, cascade-type refrigeration processes can include some level of heat integration. For example, a cascade-type refrigeration process can cool one or more refrigerants having a higher volatility through indirect heat exchange with one or more refrigerants having a lower volatility. In addition to cooling the natural gas stream through indirect heat exchange with one or more refrigerants, cascade and mixed-refrigerant LNG systems can employ one or more expansion cooling stages to simultaneously cool the LNG while reducing its pressure.

In one implementation, the LNG process may employ a cascade-type refrigeration process that uses a plurality of multi-stage cooling cycles, each employing a different refrigerant composition, to sequentially cool the natural gas stream to lower and lower temperatures. For example, a first refrigerant may be used to cool a first refrigeration cycle. A second refrigerant may be used to cool a second refrigeration cycle. A third refrigerant may be used to cool a third refrigeration cycle. Each refrigeration cycle may include a closed cycle or an open cycle. The terms "first", "second", and "third" refer to the relative position of a refrigeration cycle. For example, the first refrigeration cycle is positioned just upstream of the second refrigeration cycle while the second refrigeration cycle is positioned upstream of the third refrigeration cycle and so forth. While at least one reference to a cascade LNG process comprising three different refrigerants in three separate refrigeration cycles is made, this is not intended to be limiting. It is recognized that a cascade LNG process involving any number of refrigerants and/or refrigeration cycles may be compatible with one or more implementations of the presently disclosed technology. Other variations to the cascade LNG process are also contemplated. It will also be appreciated that the presently disclosed technology may be utilized in non-cascade LNG processes. One example of a non-cascade LNG process involves a mixed refrigerant LNG process that employs a combination of two or more refrigerants to cool the natural gas stream in at least one cooling cycle.

To begin a detailed description of an example cascade LNG facility 100 in accordance with the implementations described herein, reference is made to FIG. 1. The LNG facility 100 generally comprises a first refrigeration cycle 30 (e.g., a propane refrigeration cycle), a second refrigeration cycle 50 (e.g., an ethylene refrigeration cycle), and a third refrigeration cycle 70 (e.g., a methane refrigeration cycle) with an expansion section 80. FIGS. 2-5 illustrate an example LNG production system 400 with a contaminant removal process that may be integrated with or deployed in connection with an LNG producing facility, such as the LNG facility 100. Those skilled in the art will recognize that FIGS. 1-5 are schematics only and, therefore, various equipment, apparatuses, or systems that would be needed in a commercial plant for successful operation have been omitted for clarity. Such components might include, for example, compressor controls, flow and level measurements and corresponding controllers, temperature and pressure controls, pumps, motors, filters, additional heat exchangers, valves, and/or the like. Those skilled in the art will recognize such components and how they are integrated into the systems and methods disclosed herein.

In one implementation, the main components of propane refrigeration cycle 30 include a propane compressor 31, a propane cooler/condenser 32, high-stage propane chillers 33A and 33B, an intermediate-stage propane chiller 34, and a low-stage propane chiller 35. The main components of ethylene refrigeration cycle 50 include an ethylene compressor 51, an ethylene cooler 52, a high-stage ethylene chiller 53, a low-stage ethylene chiller/condenser 55, and an ethylene economizer 56. The main components of methane refrigeration cycle 70 include a methane compressor 71, a methane cooler 72, and a methane economizer 73. The main components of expansion section 80 include a high-stage methane expansion valve and/or expander 81, a high-stage methane flash drum 82, an intermediate-stage methane expansion valve and/or expander 83, an intermediate-stage methane flash drum 84, a low-stage methane expansion valve and/or expander 85, and a low-stage methane flash drum 86. While "propane," "ethylene," and "methane" are used to refer to respective first, second, and third refrigerants, it should be understood that these are examples only, and the presently disclosed technology may involve any combination of suitable refrigerants.

In some implementations, operation of the LNG facility 100 begins with the propane refrigeration cycle 30. Propane is compressed in a multi-stage (e.g., three-stage) propane compressor 31 driven by, for example, a gas turbine driver (not illustrated). The stages of compression may exist in a single unit or a plurality of separate units mechanically coupled to a single driver. Upon compression, the propane is passed through a conduit 300 to a propane cooler 32 where the propane is cooled and liquefied through indirect heat exchange with an external fluid (e.g., air or water). A portion of the stream from the propane cooler 32 can then be passed through conduits 302 and 302A to a pressure reduction system 36A, for example, an expansion valve, as illustrated in FIG. 1. At the pressure reduction system 36A, the pressure of the liquefied propane is reduced, thereby evaporating or flashing a portion of the liquefied propane. A resulting two-phase stream then flows through a conduit 304A into a high-stage propane chiller 33A, which cools the natural gas stream in indirect heat exchange 38. A high stage propane chiller 33A uses the flashed propane refrigerant to cool the incoming natural gas stream in a conduit 110. Another portion of the stream from the propane cooler 32 is routed through a conduit 302B to another pressure reduction system 36B, illustrated, for example, in FIG. 1 as an expansion valve. At the pressure reduction system 36B, the pressure of the liquefied propane is reduced in a stream 304B.

The cooled natural gas stream from the high-stage propane chiller 33A flows through a conduit 114 to a separation vessel or vessels. At the separation vessel or vessels, water and in some cases a portion of the propane and/or heavier components are removed. In some cases, where removal is not completed in upstream processing, a treatment system 40 may follow the separation vessels. The treatment system 40 removes moisture, mercury and mercury compounds, particulates, and other contaminants to create a treated stream. The stream exits the treatment system 40 through a conduit 116. The stream 116 then enters the intermediate-stage propane chiller 34. At the intermediate-stage propane chiller 34, the stream is cooled in indirect heat exchange 41 via indirect heat exchange with a propane refrigerant stream. The resulting cooled stream output into a conduit 118 is routed to the low-stage propane chiller 35, where the stream can be further cooled through indirect heat exchange means 42. The resultant cooled stream exits the low-stage propane chiller 35 through a conduit 120. Subsequently, the cooled stream in the conduit 120 is routed to the high-stage ethylene chiller 53.

A vaporized propane refrigerant stream exiting the high-stage propane chillers 33A and 33B is returned to a high-stage inlet port of the propane compressor 31 through a conduit 306. An un-vaporized propane refrigerant stream exits the high-stage propane chiller 33B via a conduit 308 and is flashed via a pressure reduction system 43, illustrated in FIG. 1 as an expansion valve, for example. The liquid propane refrigerant in the high-stage propane chiller 33A provides refrigeration duty for the natural gas stream. A two-phase refrigerant stream enters the intermediate-stage propane chiller 34 through a conduit 310, thereby providing coolant for the natural gas stream (in conduit 116) and the stream entering the intermediate-stage propane chiller 34 through a conduit 204. The vaporized portion of the propane refrigerant exits the intermediate-stage propane chiller 34 through a conduit 312 and enters an intermediate-stage inlet port of the propane compressor 31. The liquefied portion of the propane refrigerant exits the intermediate-stage propane chiller 34 through a conduit 314 and is passed through a pressure-reduction system 44, for example an expansion valve, whereupon the pressure of the liquefied propane refrigerant is reduced to flash or vaporize a portion of the liquefied propane. The resulting vapor-liquid refrigerant stream is routed to the low-stage propane chiller 35 through a conduit 316. At the low-stage propane chiller 35, the refrigerant stream cools the methane-rich stream and an ethylene refrigerant stream entering the low-stage propane chiller 35 through the conduits 118 and 206, respectively. The vaporized propane refrigerant stream exits the low-stage propane chiller 35 and is routed to a low-stage inlet port of the propane compressor 31 through a conduit 318. The vaporized propane refrigerant stream is compressed and recycled at the propane compressor 31 as previously described.

In one implementation, a stream of ethylene refrigerant in a conduit 202 enters the high-stage propane chiller 33B. At the high-stage propane chiller 33B, the ethylene stream is cooled through indirect heat exchange 39. The resulting cooled ethylene stream is routed in the conduit 204 from the high-stage propane chiller 33B to the intermediate-stage propane chiller 34. Upon entering the intermediate-stage propane chiller 34, the ethylene refrigerant stream may be further cooled through indirect heat exchange 45 in the intermediate-stage propane chiller 34. The resulting cooled ethylene stream exits the intermediate-stage propane chiller 34 and is routed through a conduit 206 to enter the low-stage propane chiller 35. In the low-stage propane chiller 35, the ethylene refrigerant stream is at least partially condensed, or condensed in its entirety, through indirect heat exchange 46. The resulting stream exits the low-stage propane chiller 35 through a conduit 208 and may be routed to a separation vessel 47. At the separation vessel 47, a vapor portion of the stream, if present, is removed through a conduit 210, while a liquid portion of the ethylene refrigerant stream exits the separator 47 through a conduit 212. The liquid portion of the ethylene refrigerant stream exiting the separator 47 may have a representative temperature and pressure of about −24° F. (about −31° C.) and about 285 psi (about 1,965 kPa). However, other temperatures and pressures are contemplated.

Turning now to the ethylene refrigeration cycle 50 in the LNG facility 100, in one implementation, the liquefied ethylene refrigerant stream in the conduit 212 enters an ethylene economizer 56, and the stream is further cooled by an indirect heat exchange 57 at the ethylene economizer 56. The resulting cooled liquid ethylene stream is output into a conduit 214 and routed through a pressure reduction system 58, such as an expansion valve. The pressure reduction system 58 reduces the pressure of the cooled predominantly liquid ethylene stream to flash or vaporize a portion of the stream. The cooled, two-phase stream in a conduit 215 enters the high-stage ethylene chiller 53. In the high-stage ethylene chiller 53, at least a portion of the ethylene refrigerant stream vaporizes to further cool the stream in the conduit 120 entering an indirect heat exchange 59. The vaporized and remaining liquefied ethylene refrigerant exits the high-stage ethylene chiller 53 through conduits 216 and 220, respectively. The vaporized ethylene refrigerant in the conduit 216 may re-enter the ethylene economizer 56, and the ethylene economizer 56 warms the stream through an indirect heat exchange 60 prior to entering a high-stage inlet port of the ethylene compressor 51 through a conduit 218. Ethylene is compressed in multi-stages (e.g., two-stage) at the ethylene compressor 51 driven by, for example, a gas turbine driver (not illustrated). The stages of compression may exist in a single unit or a plurality of separate units mechanically coupled to a single driver.

The cooled stream in the conduit 120 exiting the low-stage propane chiller 35 is routed to the high-stage ethylene chiller 53, where it is cooled via the indirect heat exchange 59 of the high-stage ethylene chiller 53. The remaining liquefied ethylene refrigerant exiting the high-stage ethylene chiller 53 in a conduit 220 may re-enter the ethylene economizer 56 and undergo further sub-cooling by an indirect heat exchange 61 in the ethylene economizer 56. The resulting sub-cooled refrigerant stream exits the ethylene economizer 56 through a conduit 222 and passes a pressure reduction system 62, such as an expansion valve, whereupon the pressure of the refrigerant stream is reduced to vaporize or flash a portion of the refrigerant stream. The resulting, cooled two-phase stream in a conduit 224 enters the low-stage ethylene chiller/condenser 55.

A portion of the cooled natural gas stream exiting the high-stage ethylene chiller 53 is routed through conduit a 122 to combine with a methane economizer outlet stream through conduit 168 to enter an indirect heat exchange 63 of the low-stage ethylene chiller/condenser 55. In the low-stage ethylene chiller/condenser 55, the cooled stream is at least partially condensed and, often, subcooled through indirect heat exchange with the ethylene refrigerant entering the low-stage ethylene chiller/condenser 55 through the conduit 224. The vaporized ethylene refrigerant exits the low-stage ethylene chiller/condenser 55 through a conduit 226, which then enters the ethylene economizer 56. In the ethylene economizer 56, vaporized ethylene refrigerant stream is warmed through an indirect heat exchange 64 prior to being fed into a low-stage inlet port of the ethylene compressor 51 through a conduit 230. As shown in FIG. 1, a stream of compressed ethylene refrigerant exits the ethylene compressor 51 through a conduit 236 and subsequently enters the ethylene cooler 52. At the ethylene cooler 52, the compressed ethylene stream is cooled through indirect heat exchange with an external fluid (e.g., water or air). The resulting cooled ethylene stream may be introduced through the conduit 202 into high-stage propane chiller 33B for additional cooling, as previously described.

The condensed and, often, sub-cooled liquid natural gas stream exiting the low-stage ethylene chiller/condenser 55 in a conduit 124 can also be referred to as a "pressurized LNG-bearing stream." This pressurized LNG-bearing stream exits the low-stage ethylene chiller/condenser 55 through the conduit 124 prior to entering a main methane economizer 73. In the main methane economizer 73, methane-rich stream in the conduit 124 may be further cooled in an indirect heat exchange 75 through indirect heat exchange with one or more methane refrigerant streams (e.g., 76, 77, 78, 79). The cooled, pressurized LNG-bearing stream exits the main methane economizer 73 through a conduit 134 and is routed to the expansion section 80 of the methane refrigeration cycle 70. In the expansion section 80, the pressurized LNG-bearing stream first passes through a high-stage methane expansion valve or expander 81, whereupon the pressure of this stream is reduced to vaporize or flash a portion thereof. The resulting two-phase methane-rich stream in a conduit 136 enters into a high-stage methane flash drum 82. In the high-stage methane flash drum 82, the vapor and liquid portions of the reduced-pressure stream are separated. The vapor portion of the reduced-pressure stream (also called the high-stage flash gas) exits the high-stage methane flash drum 82 through a conduit 138 and enters into the main methane economizer 73. At the main methane economizer 73, at least a portion of the high-stage flash gas is heated through the indirect heat exchange means 76 of the main methane economizer 73. The resulting warmed vapor stream exits the main methane economizer 73 through the conduit 138 and is routed to a high-stage inlet port of the methane compressor 71, as shown in FIG. 1.

The liquid portion of the reduced-pressure stream exits the high-stage methane flash drum 82 through a conduit 142 and re-enters the main methane economizer 73. The main methane economizer 73 cools the liquid stream through indirect heat exchange 74 of the main methane economizer 73. The resulting cooled stream exits the main methane economizer 73 through a conduit 144 and is routed to a second expansion stage, illustrated in FIG. 1 as intermediate-stage expansion valve 83 and/or expander, as an example. The intermediate-stage expansion valve 83 further reduces the pressure of the cooled methane stream, which reduces a temperature of the stream by vaporizing or flashing a portion of the stream. The resulting two-phase methane-rich stream output in a conduit 146 enters an intermediate-stage methane flash drum 84. Liquid and vapor portions of the stream are separated in the intermediate-stage flash drum 84 and output through conduits 148 and 150, respectively. The vapor portion (also called the intermediate-stage flash gas) in the conduit 150 re-enters the methane economizer 73, wherein the vapor portion is heated through an indirect heat exchange 77 of the main methane economizer 73. The resulting warmed stream is routed through a conduit 154 to the intermediate-stage inlet port of methane compressor 71.

The liquid stream exiting the intermediate-stage methane flash drum 84 through the conduit 148 passes through a low-stage expansion valve 85 and/or expander, whereupon the pressure of the liquefied methane-rich stream is further reduced to vaporize or flash a portion of the stream. The resulting cooled two-phase stream is output in a conduit 156 and enters a low-stage methane flash drum 86, which separates the vapor and liquid phases. The liquid stream exiting the low-stage methane flash drum 86 through a conduit 158 comprises the liquefied natural gas (LNG) product at near atmospheric pressure. This LNG product may be routed downstream for subsequent storage, transportation, and/or use.

A vapor stream exiting the low-stage methane flash drum 86 (also called the low-stage methane flash gas) in a conduit 160 is routed to the methane economizer 73. The methane economizer 73 warms the low-stage methane flash gas through an indirect heat exchange 78 of the main methane economizer 73. The resulting stream exits the methane economizer 73 through a conduit 164. The stream is then routed to a low-stage inlet port of the methane compressor 71.

The methane compressor 71 comprises one or more compression stages. In one implementation, the methane compressor 71 comprises three compression stages in a single module. In another implementation, one or more of the compression modules are separate but mechanically coupled to a common driver. Generally, one or more intercoolers (not shown) are provided between subsequent compression stages.

As shown in FIG. 1, a compressed methane refrigerant stream exiting the methane compressor 71 is discharged into a conduit 166. The compressed methane refrigerant is routed to the methane cooler 72, and the stream is cooled through indirect heat exchange with an external fluid (e.g., air or water) in the methane cooler 72. The resulting cooled methane refrigerant stream exits the methane cooler 72 through a conduit 112 and is directed to and further cooled in the propane refrigeration cycle 30. Upon cooling in the propane refrigeration cycle 30 through a heat exchanger 37, the methane refrigerant stream is discharged into a conduit 130 and subsequently routed to the main methane economizer 73, and the stream is further cooled through indirect heat exchange 79. The resulting sub-cooled stream exits the main methane economizer 73 through a conduit 168 and then combined with the stream in the conduit 122 exiting the high-stage ethylene chiller 53 prior to entering the low-stage ethylene chiller/condenser 55, as previously discussed.

In some cases, the natural gas being processed upstream of the OCP (e.g., a feed pretreatment system) may include contaminants such as mercury, mercury compounds, arsenic, and arsenic compounds in addition to trace heavy hydrocarbon components (e.g., C6+). Detection of the heavy hydrocarbon components may be difficult at low concentrations and there may not be enough heavy components to allow typical heavy hydrocarbon removal by fractionation upstream of the LNG facility, and so C6+ freezing may happen at later sections in the LNG process, including within equipment and piping located upstream of a typical heavies removal unit. Pipeline gas typically contains organometallic and ionic mercury and may also contain arsenic and arsenic compounds that must be removed. However, systems to remove mercury and arsenic compounds sometimes do not adequately remove the heavy hydrocarbon components. Activated carbon beds may remove mercury and arsenic compounds but quickly saturate with heavy hydrocarbon components, which may require frequent replacement that would otherwise not require replacement resulting from the adsorption of elemental, ionic or organometallic mercury and/or arsenic compounds. Vapor phase activated carbon beds are generally dumped and replaced and not regenerated. Since the activated beds may saturate quickly, the downtime to dump and replace the carbon may become financially prohibitive. However, if the heavy hydrocarbons are not removed, hydrocarbon components may saturate the activated carbon and breakthrough leading to freezing in subsequent downstream LNG plant equipment, including LNG plant equipment located upstream of the typical fractionation system designed to remove the heavy hydrocarbon components. For example, for lean feed gas streams with trace amounts of heavy hydrocarbons (C6+) but relatively few components with molecular weights and boiling points between (C2-C6), freezing may occur upstream of the heavies removal fractionation equipment. This is a frequent problem with lean gas reservoirs and natural gas pipeline feed compositions. In such cases, a method of periodically stripping heavy hydrocarbon components from the activated carbon beds before heavy hydrocarbon components completely saturated and breakthrough, but without removing the adsorbed mercury or arsenic components that typically require many years to saturate the beds, can greatly improve LNG plant onstream time.

The contaminant removal process of the presently disclosed technology solves the issues of removing all of the problematic contaminants (e.g., heavy hydrocarbon components and elemental, ionic compounds and organometallic compounds such as mercury and arsenic compounds) while preventing plant downtime and excessive flaring incurred during defrosting the frozen hydrocarbons and/or organometallic arsenic compounds and subsequently removing from the process.

In example implementations, mercury and arsenic compounds are removed by filtering a natural gas feed through a set of sorbent beds co-loaded with a metal sulfide sorbent and a metal oxide sorbent. The metal sulfide sorbent may adsorb and cause removal of the mercury and mercury compounds while the metal oxide sorbent may adsorb and cause removal of the arsenic and arsenic compounds. The heavy hydrocarbon components may be removed by activated carbon, which may be co-loaded in the set of metal sulfide and metal oxide sorbents, or may be loaded into a second set of sorbent beds or a heavy component removal bed, for instance, downstream from a first set of sorbent beds including the metal sulfide and metal oxide sorbents. The set of sorbent beds including the metal sulfide and metal oxide sorbents may be arranged at various locations throughout the feed pretreatment system upstream of the OCP at different processing stages, and/or multiple sets of sorbent beds including the metal sulfide and metal oxide sorbents and activated carbon may be included. The contaminant removal process of the presently disclosed technology thus provides a flexible process for removing elemental, ionic and organometallic mercury and arsenic compounds in addition to heavy hydrocarbon components from a natural gas stream. The contaminant removal process may be deployed in front of or integrated within a liquefaction process to prevent solids deposition within LNG plant equipment, thereby providing design and operation flexibility operable for a wide range of natural gas compositions, pipeline compositional variations, and LNG architectures.

Turning to FIG. 2, an example LNG production system 400 for performing a contaminant removal process with one or more sets of sorbent beds that remove mercury, mercury compounds, arsenic, arsenic compounds, and/or heavy hydrocarbon components is shown. The LNG production system 400 may be deployed in the LNG facility 100, for example to remove the mercury, the mercury compounds, the arsenic, and the arsenic compounds at treatment system 40. System 40 may typically be located upstream of the OCP, for instance, as part of a feed pretreatment system. In some examples, the LNG production system 400 may be process and heat integrated with the propane refrigeration the cycle 30, the ethylene refrigeration cycle 50, or the methane refrigeration cycle 70.

In one implementation, the LNG production system 400 includes a feed gas filter coalescer 402 that receives a natural gas feed, for example, from conduit 110 or, in some examples, conduit 114. The LNG production system 400 further includes an acid gas absorber 404, an absorber overhead gas cooler 406, an absorber overhead dehydrator feed cross exchanger 408, a dehydrator inlet chiller 410, a dryer feed knock out (KO) drum 412, a dryer inlet filter coalescer 414, one or more molecular sieve dehydrators 416, one or more post-sieve filters 418, a regeneration gas heater 420, and one or more regeneration components 422 (e.g., a regeneration gas cooler, a regeneration gas knock out drum, and/or a regeneration gas compressor), among other components and equipment.

In some examples, the LNG production system 400 may include a set of sorbent beds 424 for removing metal and metallic compounds, which may be arranged to receive the natural gas feed from the dryer feed KO drum 412 and output a filtered or partially filtered natural gas feed to the dryer inlet filter coalescer 414. Additionally, or alternatively, the set of sorbent beds 424 may be positioned in various other locations such as 426 in the contamination removal process. The LNG production system 400 may include one or more heavy component removal beds 428 for removing heavy hydrocarbons. A regeneration gas trim cooler 430 may be positioned downstream from the regeneration gas heater 420 and/or upstream from the one or more heavy component removal beds 428.

In some examples, the feed gas filter coalescer 402 removes or partially removes solid particulates, bulk liquid and liquid aerosol particles from the natural gas feed, for instance, to improve pipeline gas purity and to filter the natural gas feed to an acceptable quality for the other components downstream from the feed gas filter coalescer 402. The feed gas filter coalescer 402 may direct the natural gas (e.g., a partially filtered natural gas stream) to the acid gas absorber 404. The acid gas absorber 404 may remove hydrogen sulfide and/or carbon dioxide from the natural gas, for instance, to form a second partially filtered natural gas stream. The acid gas absorber overhead gas cooler 406, if required or desired to install, may receive natural gas vapors from an overhead outlet of the acid gas absorber 404 and may chill the natural gas vapor to form a chilled natural gas.

In some examples, the chilled natural gas may be directed from the absorber overhead gas cooler 406 to the absorber overhead dehydrator feed cross exchanger 408, if needed, for to superheat the vapor feed to the molecular sieve dehydrators 416 to avoid retrograde condensation, while partially recovering the refrigeration energy required to condense some of the water from the natural gas in gas cooler 410 to a temperature equal to or slightly higher than the hydrate or freezing temperature. The chilled natural gas stream exiting a gas cooler 410 may then be routed to the dryer feed KO drum 412 for liquid-vapor separation. An overhead outlet of the dryer feed KO drum 412 may send a vapor portion of the liquid-vapor separation occurring in the dryer feed KO drum 412 to the set of sorbent beds 424.

In some examples, the set of sorbent beds 424 may be co-loaded with a metal sulfide and/or a metal oxide sorbent. The metal sulfide sorbent may cause the set of sorbent beds 424 to adsorb and remove contaminants from the natural gas stream, such as mercury and mercury compounds. The metal oxide sorbent may cause the set of sorbent beds 424 to adsorb and remove the contaminants from the natural gas stream, such as arsenic and arsenic compounds. Upon removing the mercury, the mercury compounds, the arsenic, and/or the arsenic compounds, the set of sorbent beds may output at least a partially filtered or purified natural gas feed to other components of the LNG production system 400 downstream from the set of sorbent beds 424. In some examples, the at least partially filtered or purified natural gas feed may be received downstream from the set of sorbent beds 424 (e.g., after being processed by other components of the LNG production system 400) at the heavy component removal bed 428. In some examples, the set of sorbent beds 424 may be a first set of beds, for removing first contaminants (e.g., the mercury, the mercury compounds, the arsenic, and/or the arsenic compounds) and the heavy component removal bed 428 may be a second set of beds loaded with activated carbon for adsorbing and removing at least some of the heavy hydrocarbon components of the natural gas (e.g., the at least partially filtered or purified natural gas feed created by the first set of beds) to create a filtered or purified natural gas feed. The filtered or purified natural gas feed having the mercury, mercury compounds, arsenic, arsenic compounds, and heavy hydrocarbon components removed may be outputted from the one or more heavy component removal beds 428 and sent to a natural gas liquid stabilizer for NGL stabilization, and/or the regeneration gas heater 420 which, in turn, may direct the natural gas feed to one or more regeneration components 422 (e.g., a regeneration gas cooler, a regeneration gas KO drum, and/or a regeneration gas compressor) and back to the feed gas filter coalescer 402.

In some examples, the at least partially filtered or purified natural gas feed created by the set of sorbent beds 424 (e.g., having the mercury, the mercury compounds, the arsenic, and/or the arsenic compounds removed) may pass through other components of the LNG production system 400 disposed between the set of sorbent beds 424 and the heavy component removal beds 428 prior to being received at the heavy component removal bed 428. For instance, the at least partially filtered or purified natural gas feed may be outputted from the set of sorbent beds 424 and received at the dryer inlet filter coalescer 414 which may remove additional contaminants and/or water from the at least partially filtered or purified natural gas feed. The dryer inlet filter coalescer 414 may send the at least partially filtered or purified natural gas feed back to the adsorber overhead dehydrator feed cross exchanger 408 for superheating, and the absorber overhead dehydrator feed cross exchanger 408 may send the at least partially filtered or purified natural gas stream to one or more molecular sieve dehydrators 416.

In some examples, the one or more molecular sieve dehydrators 416 may receive the purified natural gas feed and perform additional water and, in some cases, contaminant removal, such as removing alcohols, $CO_2$ and other polar molecules. The one or more molecular sieve dehydrators 416 may be regenerated while online and in a manner that avoids creating downtime for the LNG production system 400 by, for instance, regenerating one of multiple molecular sieve dehydrators 416 in parallel while continuing to run the filtration process with the other molecular sieve dehydrators of the one or more molecular sieve dehydrators 416 not being regenerated at that time. In some examples, the one or more molecular sieve dehydrators 416 may output the at least partially filtered or purified natural gas stream to a filter 418 which, in turn may output the at least partially filtered or purified natural gas stream to one or more heavy component removal beds 428 which, as noted above, may be loaded with activated carbon for removing the heavy hydrocarbon compounds. The filtered natural gas may be outputted from the one or more heavy component removal beds 428 to a filter 418 and/or at least a portion of the gas to the regeneration gas heater 420, with the remaining portion of gas to the liquefaction/refrigeration section of the facility. A portion of the filtered natural gas, for instance, outputted to the regeneration gas heater 420 may be sent to one or more molecular sieve dehydrators 416 and/or regeneration components 422 (e.g., a regeneration gas cooler, a regeneration gas KO drum, and/or a regeneration gas compressor) and back to the feed gas filter coalescer 402. A regeneration gas trim cooler 430 may provide cooling for a portion of the filtered natural gas sent to the molecular sieve dehydrators 416 for regeneration. The portion of the gas exiting the regeneration gas trim cooler 430 may be outputted to at least one of the heavy component removal beds 428 (e.g., activated carbon beds) to remove adsorbed heavy hydrocarbons. The portion of regeneration gas containing the desorbed heavy hydrocarbon components may subsequently be outputted to an NGL Stabilizer, or to another means of processing such as the fuel and/or flare system(s).

FIG. 2 illustrates the set of sorbent beds 424 arranged upstream from the heavy component removal bed 428 and between the dryer feed KO drum 412 (e.g., downstream from the dryer feed KO drum 412) and the dryer inlet filter coalescer 414 (e.g., upstream from the dryer inlet filter coalescer 414). The set of sorbent beds 424 may be arranged, additionally or alternatively, at the other locations 426 in the LNG production system 400. For instance, the set of sorbent beds 424 may be at the other location 426 upstream from the feed gas filter coalescer 402 and may direct the at least partially filtered or purified natural gas stream into the feed gas filter coalescer 402. The set of sorbent beds 424 may be positioned between the feed gas filter coalescer 402 (e.g., downstream from the feed gas filter coalescer 402) and the acid gas absorber 404 (e.g., upstream from the acid gas absorber 404). The set of sorbent beds 424 may be at the other location 426 between the acid gas absorber 404 (e.g., downstream from the acid gas absorber 404) and the absorber overhead gas cooler 406 (e.g., upstream from the absorber overhead gas cooler 406. The set of sorbent beds 424 may be at the other location 426 between the dryer inlet filter and coalescer 414 (e.g., downstream from the dryer inlet filter and coalescer 414) and the absorber overhead dehydrator feed cross exchanger 408 (e.g., upstream from the absorber overhead dehydrator feed cross exchanger 408). The set of sorbent beds 424 may be at the other location 426 between the absorber overhead dehydrator feed cross exchanger 408 (e.g., downstream from the absorber overhead dehydrator feed cross exchanger 408) and the one or more molecular sieve dehydrators 416 (e.g., upstream from the one or more molecular sieve dehydrators 416). The set of sorbent beds 424 may be at the other location 426 between the one or more molecular sieve dehydrators 416 (e.g., downstream from the one or more molecular sieve dehydrators 416 and/or the filter 418 following the one or more molecular sieve dehydrators 416) and the one or more heavy component removal beds 428 (e.g., upstream from the one or more heavy component removal beds 428). The set of sorbent beds 424 may be at the other location 426 between the one or more heavy component removal beds 428 (e.g., downstream from the one or more heavy component removal beds 428 and/or the filter 418 following the one or more heavy compound removal beds) and the regeneration gas heater 420.

Figure 3:
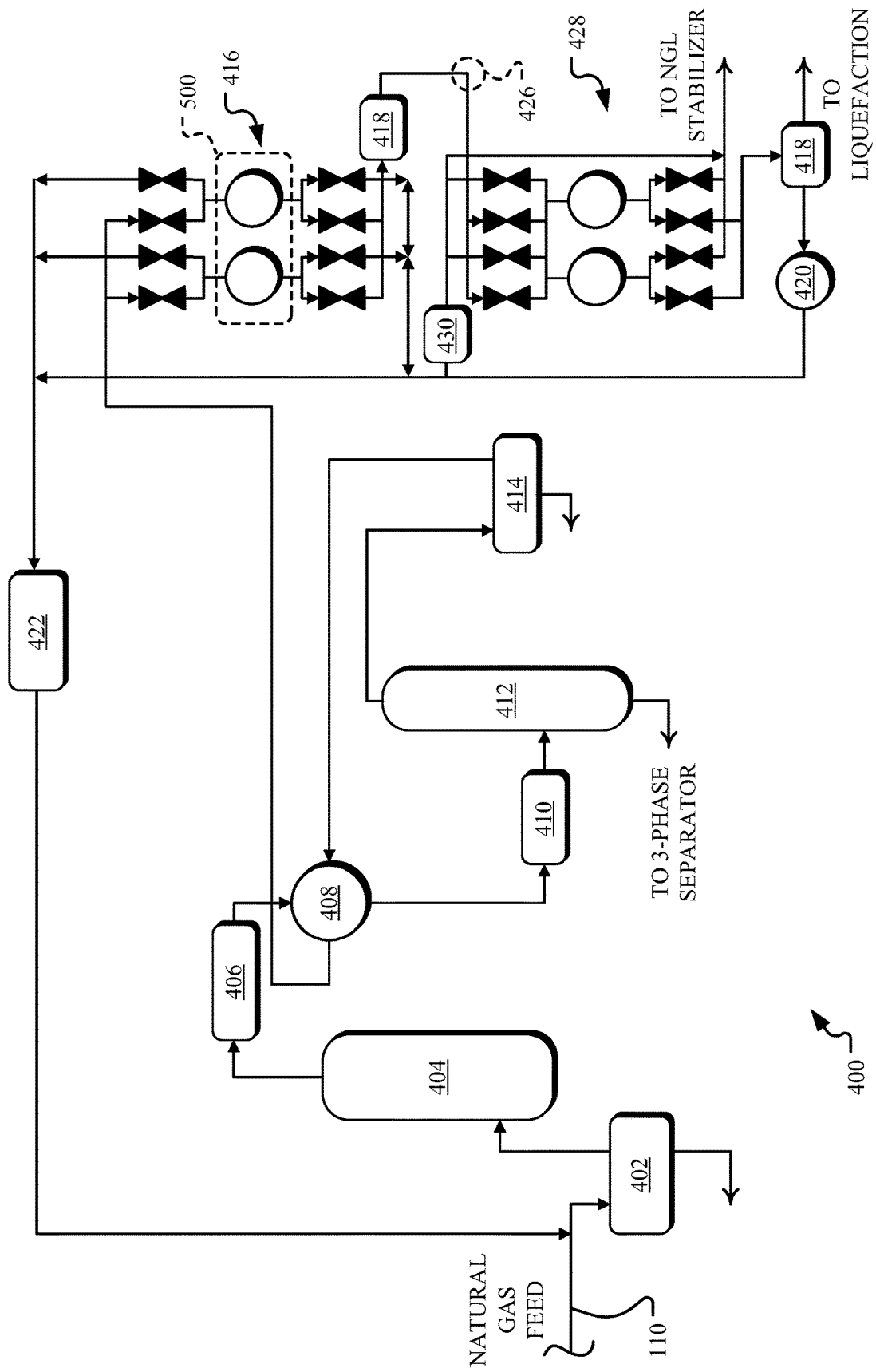
FIG. 3 illustrates an example LNG production system with a process for removing contaminants during LNG production.

FIG. 3 illustrates an example LNG pretreatment system 400 for removing contaminants from the natural gas feed. In some instances, the LNG pretreatment system 400 may include a contaminant removal process 500 occurring at the one or more molecular sieve dehydrators 416. For instance, the one or more molecular sieve dehydrators 416 may be co-loaded with 3A or 4A sieves and a 3A impregnated sieve (e.g., impregnated with silver). As such, the contaminant removal process 500 may include removing at least some of the mercury and the mercury compounds at the one or more molecular sieve dehydrators 416 and/or during a dehydration process. The one or more molecular sieve dehydrators 416 may perform the operations of the set of sorbent beds 424 by removing the first contaminants. Moreover, the one or more molecular sieve dehydrators 416 may be arranged upstream from the set of sorbent beds 424 at the location 426 and/or upstream from the heavy component removal beds 428, which may perform additional contaminant removal (e.g., to remove second contaminants) after the contaminant removal process 500 occurring at the one or more molecular sieve dehydrators 416.

Figure 4:
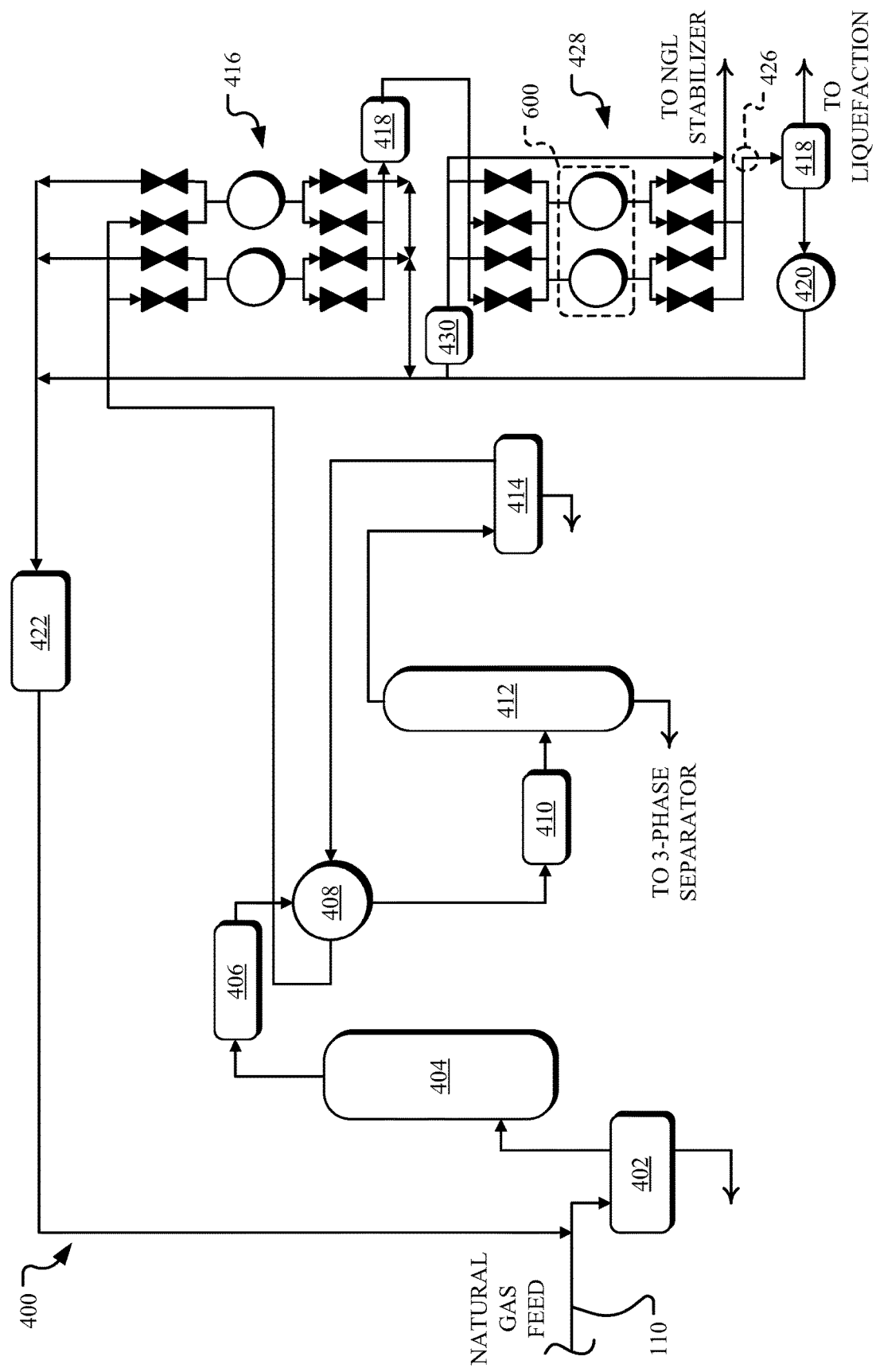
FIG. 4 illustrates an example LNG production system with a process for removing contaminants during LNG production.

FIG. 4 illustrates an example LNG production system 400 for removing contaminants from the natural gas feed. In some instances, the LNG production system 400 may include a contaminant removal process 600 occurring at the heavy compounds removal bed 428. For instance, the heavy component removal bed 428 having activated carbon for removing heavy hydrocarbon components during the contaminant removal process 600 may additionally be co-loaded with the metal sulfide sorbent for removing the mercury and mercury compounds during the contaminant removal process 600 and/or co-loaded with the metal oxide sorbent for removing the arsenic and arsenic compounds during the contaminant removal process 600. In some instances, the heavy component removal bed 428 co-loaded with the metal sulfide sorbent and/or the metal oxide sorbent may be a first set of sorbent beds, and the contaminant removal process 600 may further include a second set of sorbent beds arranged downstream from the first set of sorbent beds (e.g., at the other location 426). The second set of sorbent beds may be co-loaded with the metal sulfide sorbent, the metal oxide sorbent, and/or the activated carbon.

Figure 5:
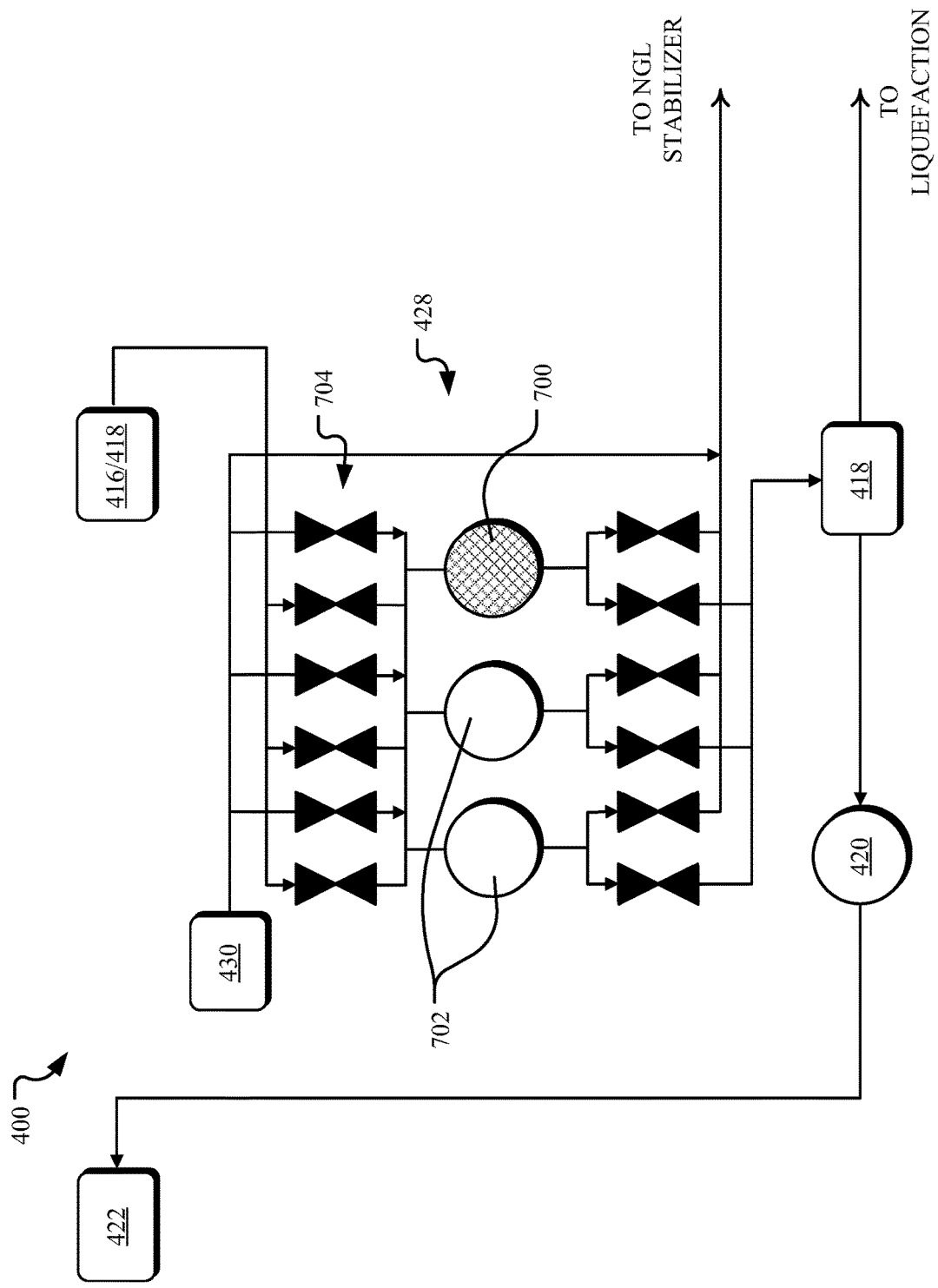
FIG. 5 illustrates an example LNG production system with a process for regenerating a heavy compound removal bed and removing contaminants during LNG production.

FIG. 5 illustrates an example LNG production system 400 for removing contaminants from the natural gas feed. The LNG production system 400 may include the one or more heavy component removal beds 428 which may be regenerable while staying online by performing a regeneration process. For instance, the heavy component removal beds 428 may include a first heavy compound removal bed 700 operating in parallel with second and/or third heavy compound removal bed(s) 702. Upon determining that the first heavy compound removal bed 700 has adsorbed a predetermined amount of heavy hydrocarbon components, such that an adsorption rate is negatively impacted (e.g., when the first heavy compound removal bed has reached capacity and can no longer effectively adsorb heavy hydrocarbon components), one or more valves 704 may be switched to redirect the natural gas feed away from the first heavy compound removal bed 700 while maintaining the natural gas feed through the second and/or third heavy compound removal bed(s) 702. The regeneration gas trim cooler 430 (e.g., and/or a temperature-controlled heat exchanger) may generate heated gas and may send the heated gas through the first heavy compound removal bed 700. The heated gas may remove heavy hydrocarbon compounds that have deposited in the first heavy compound removal bed 700 while leaving the activated carbon in place in the first heavy compound removal bed 700. After the heavy hydrocarbon compounds have been removed from the first heavy compound removal bed 700, gas through the regeneration gas trim cooler 430 may be discontinued and/or the one or more valves 704 may be switched to connect the regeneration gas trim cooler 430 to a second heavy compound removal bed 700. The one or more valves 704 may be switched to bring the first heavy compound removal bed 700 back online and receiving the natural gas feed from other components of the LNG production system 400, such as the filter 418 and/or the one or more molecular sieve dehydrators 416 upstream from the filter 418. The regeneration process may be performed for the second and/or third heavy compound removal bed(s) 702 while maintaining the first heavy compound removal bed 700 online and processing the natural gas stream. Accordingly, the regeneration process may continually remove heavy hydrocarbon compounds that build up in the heavy component removal beds 428 while keeping the activated carbon in place and while maintaining at least one heavy component removal bed 428 online at all times. As such, the regeneration process may reduce downtime for the downstream LNG production system 400, reduce the amount of flare offs needed to clear contaminants from the LNG production system 400 and, therefore, reduce the amount of greenhouse gases generated by the LNG production system 400.

Figure 6:
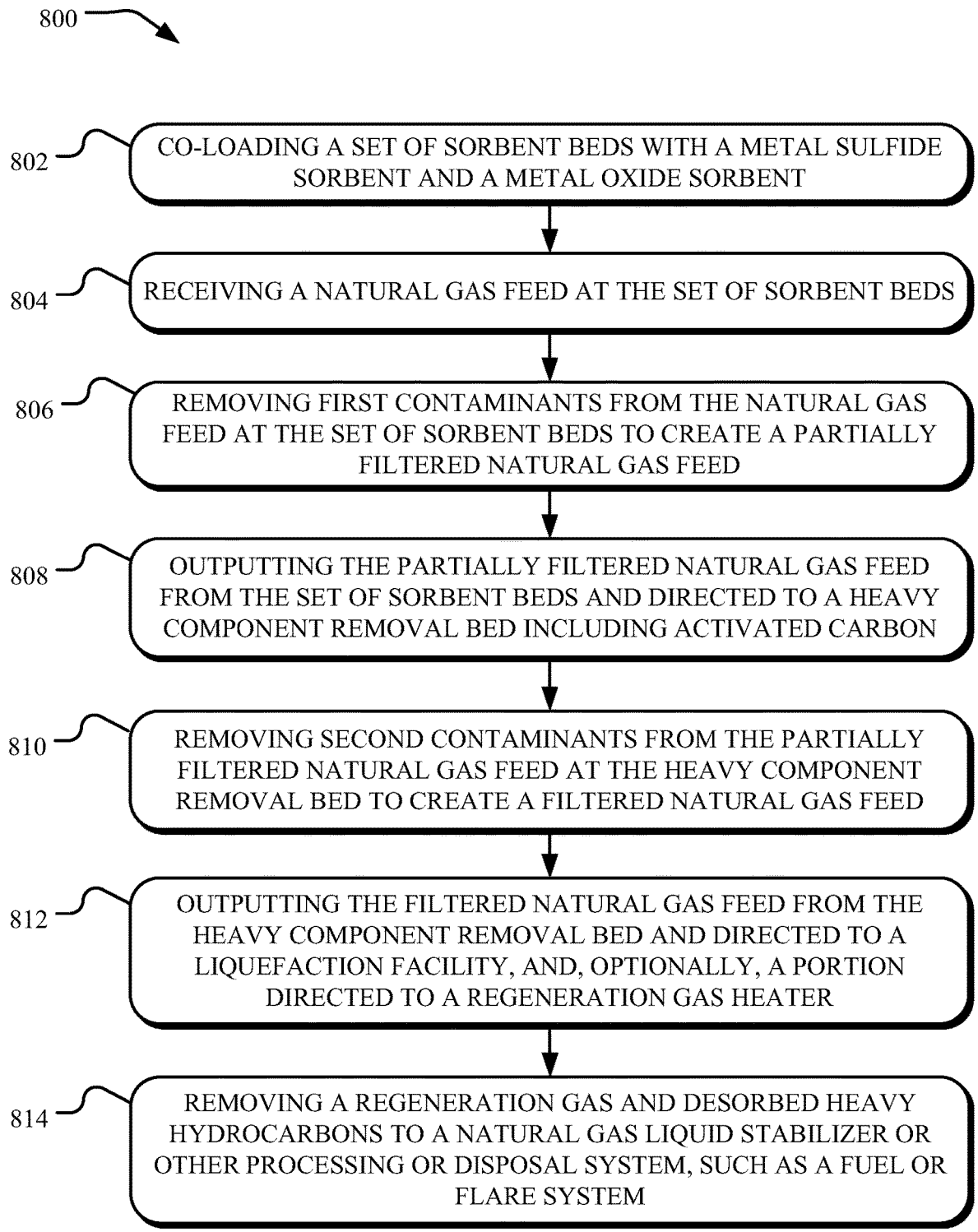
FIG. 6 illustrates example operations for removing contaminants in LNG production.

FIG. 6 illustrates an example method 800 that may be performed by any of the systems discussed herein to remove contaminants from natural gas. At step 802, the method 800 may include co-loading the set of sorbent beds 424 with the metal sulfide sorbent and the metal oxide sorbents. At step 804, the method 800 may include receiving the natural gas feed at the set of sorbent beds 424. At step 806, the method 800 may include removing first contaminants form the natural gas feed at the set of sorbent beds 424 (e.g., mercury, mercury compounds, arsenic, and/or arsenic compounds) to create a partially filtered natural gas feed. At step 808, the method 800 may include outputting the partially filtered natural gas feed from the set of sorbent beds 424 and directed to the heavy component removal bed 428. At step 810, the method 800 may include removing second contaminants from the partially filtered natural gas feed (e.g., heavy hydrocarbon compounds) to create a filtered natural gas feed. At step 812, the method 800 may include outputting the filtered natural gas feed from the heavy component removal bed 428 and directed to a liquefaction facility and, optionally, a portion directed to the regeneration gas heater 420. At step 814, the method 800 may include removing a regeneration gas and desorbed heavy hydrocarbon components to a natural gas liquid (NGL) Stabilizer or other processing or disposal system, such as a fuel system, a flare system, and/or other means of processing and/or disposal.

Figure 7:
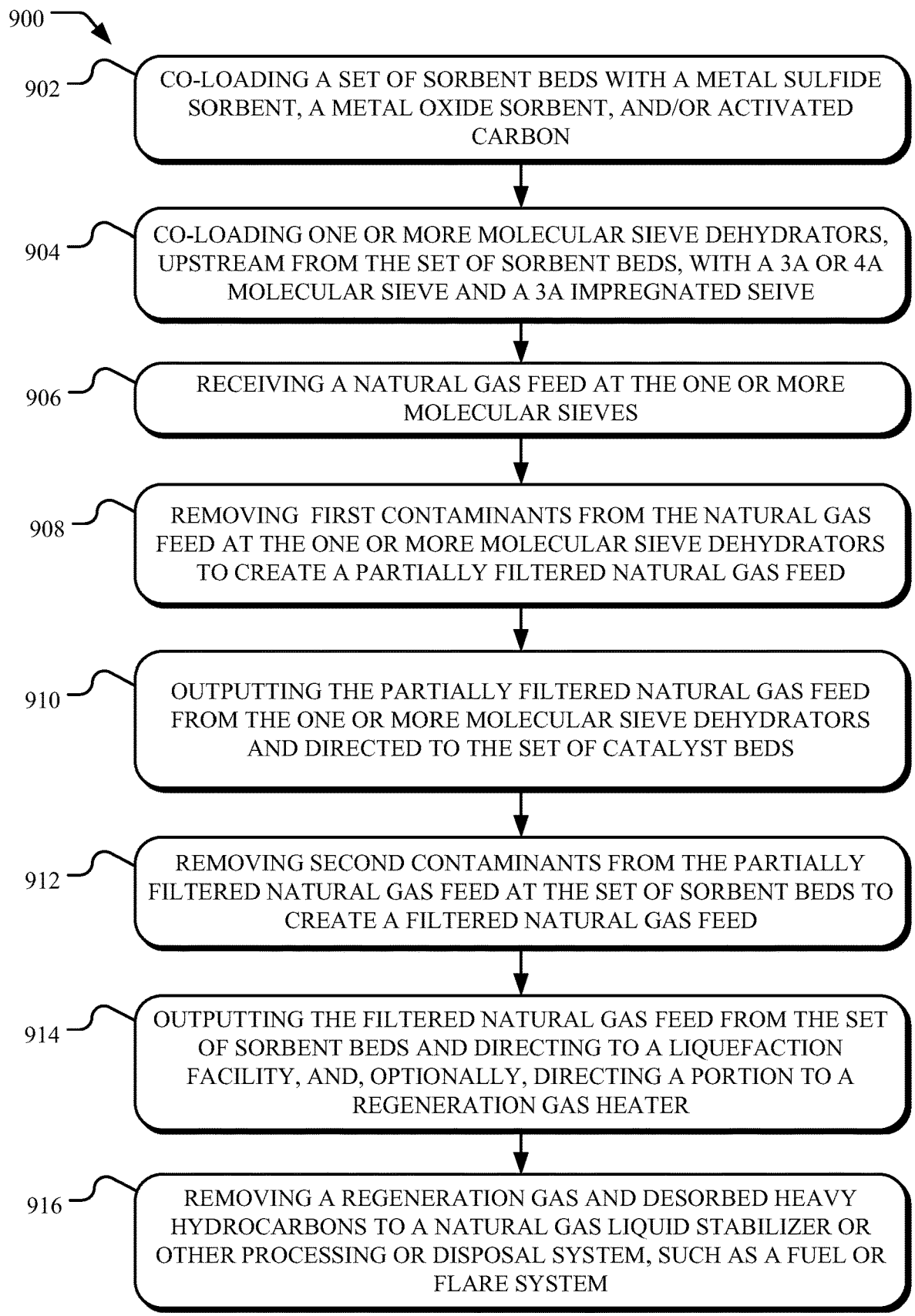
FIG. 7 illustrates example operations for removing contaminants in LNG production.

FIG. 7 illustrates an example method 900 that may be performed by any of the systems discussed herein to remove contaminants from natural gas. At step 902, the method 900 may include co-loading a set of sorbent beds 424 with the metal sulfide sorbent, a metal oxide sorbent and/or activated carbon. At step 904, the method 900 may include co-loading the one or more molecular sieve dehydrators 416, upstream from the set of sorbent beds 424, with a 3A or 4A molecular sieve and a 3A impregnated sieve (e.g., impregnated with silver). At step 906, the method 900 may include receiving a natural gas feed at the one or more molecular sieve dehydrators 416. At step 908, the method 900 may include removing first contaminants (e.g. mercury and mercury compounds) from the natural gas feed at the one or more molecular sieve dehydrators 416 to create a partially filtered natural gas feed. At step 910, the method 900 may include outputting the partially filtered natural gas feed from the one or more molecular sieve dehydrators 416. At step 912, the method 900 may include removing second contaminants (e.g., mercury, mercury compounds, arsenic, arsenic compounds, and/or heavy hydrocarbon components) from the partially filtered natural gas feed at the set of sorbent beds 424 to create a filtered natural gas feed. At step 914, the method may include outputting the filtered natural gas feed from the set of sorbent beds and directing to a liquefaction facility and, optionally, directing a portion to the regeneration gas heater 420. At step 916, the method 900 may include removing a regeneration gas and desorbed heavy hydrocarbon components to a natural gas liquid (NGL) Stabilizer or other processing or disposal system, such as a fuel system, a flare system, and/or other means of processing and/or disposal.

Figure 8:
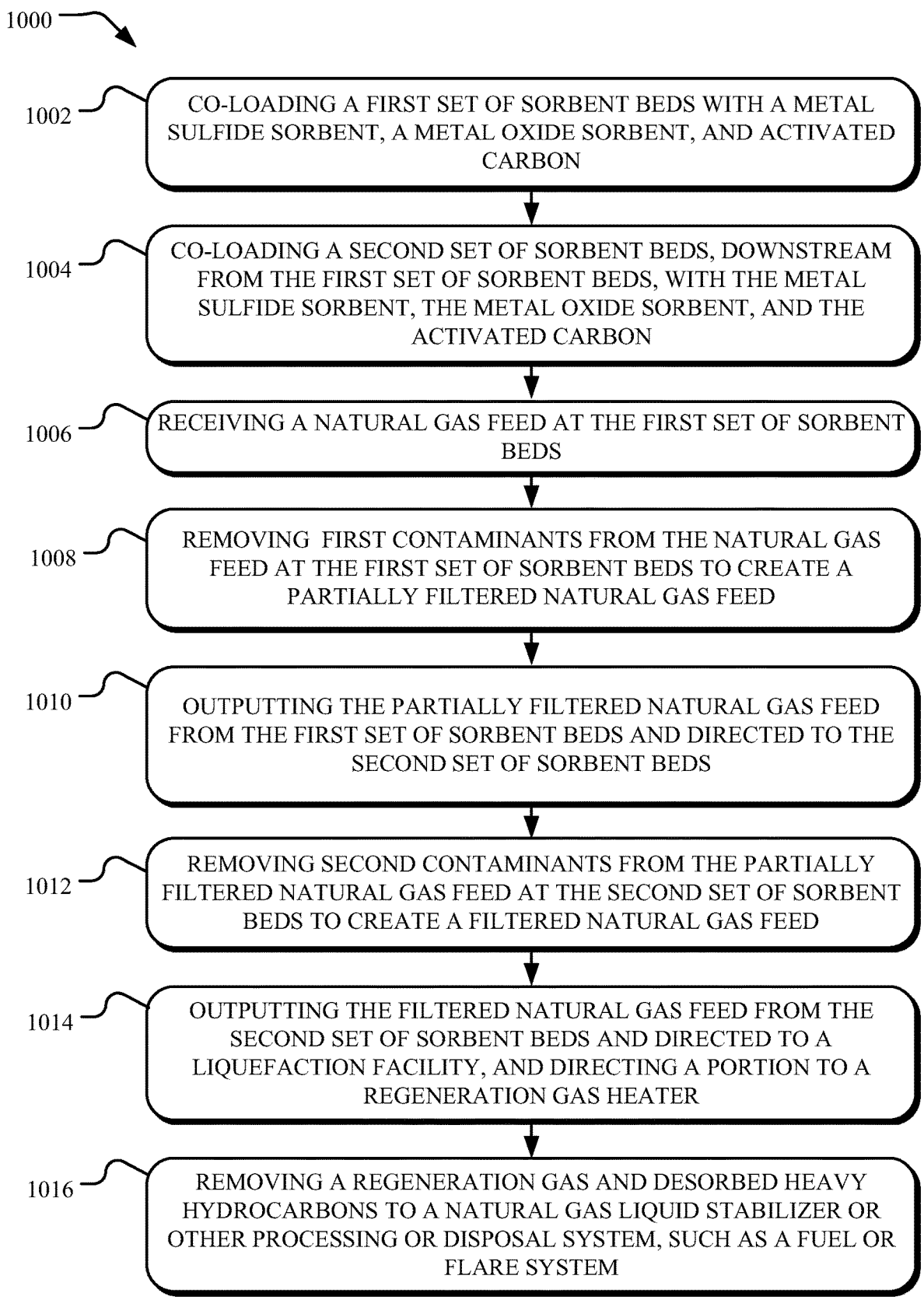
FIG. 8 illustrates example operations for removing contaminants in LNG production.

FIG. 8 illustrates an example method 1000 that may be performed by any of the systems discussed herein to remove contaminants from natural gas. At step 1002, the method 1000 may include co-loading a first set of sorbent beds 424 with a metal sulfide sorbent, a metal oxide sorbent, and activated carbon. At step 1004, the method 1000 may include co-loading a second set of sorbent beds 424, downstream from the first set of sorbent beds 424, with a metal sulfide sorbent, a metal oxide sorbent, and activated carbon. At step 1006, the method 1000 may include receiving a natural gas feed at the first set of sorbent beds. At step 1008, the method 1000 may include removing first contaminants (e.g., mercury, mercury compounds, arsenic, arsenic compounds, and/or heavy carbon components) from the natural gas feed at the first set of sorbent beds 424 to create a partially filtered natural gas feed. At step 1010, the method 1000 may include outputting the partially filtered natural gas feed from the first set of sorbent beds 424 and directed to the second set of sorbent beds 424 (either directly or through one or more intermediary components of the LNG production system 400). The partially filtered natural gas feed can be temperature controlled (e.g., heated, cooled, and/or maintained at a predefined temperature). At step 1012, the method 1000 may include removing second contaminates (e.g., mercury, mercury compounds, arsenic, arsenic compounds, and/or heavy carbon components) from the partially filtered natural gas feed at the second set of sorbent beds 424 to create a filtered natural gas feed. At step 1014, the method 1000 may include outputting the filtered natural gas feed from the second set of sorbent beds 424 and directed to a liquefaction facility and directing a portion to the regeneration gas heater 420. At step 1016, the method 1000 may include removing a regeneration gas and desorbed heavy hydrocarbon components to a natural gas liquid (NGL) Stabilizer or other processing or disposal system, such as a fuel system, a flare system, and/or other means of processing and/or disposal.

Figure 9:
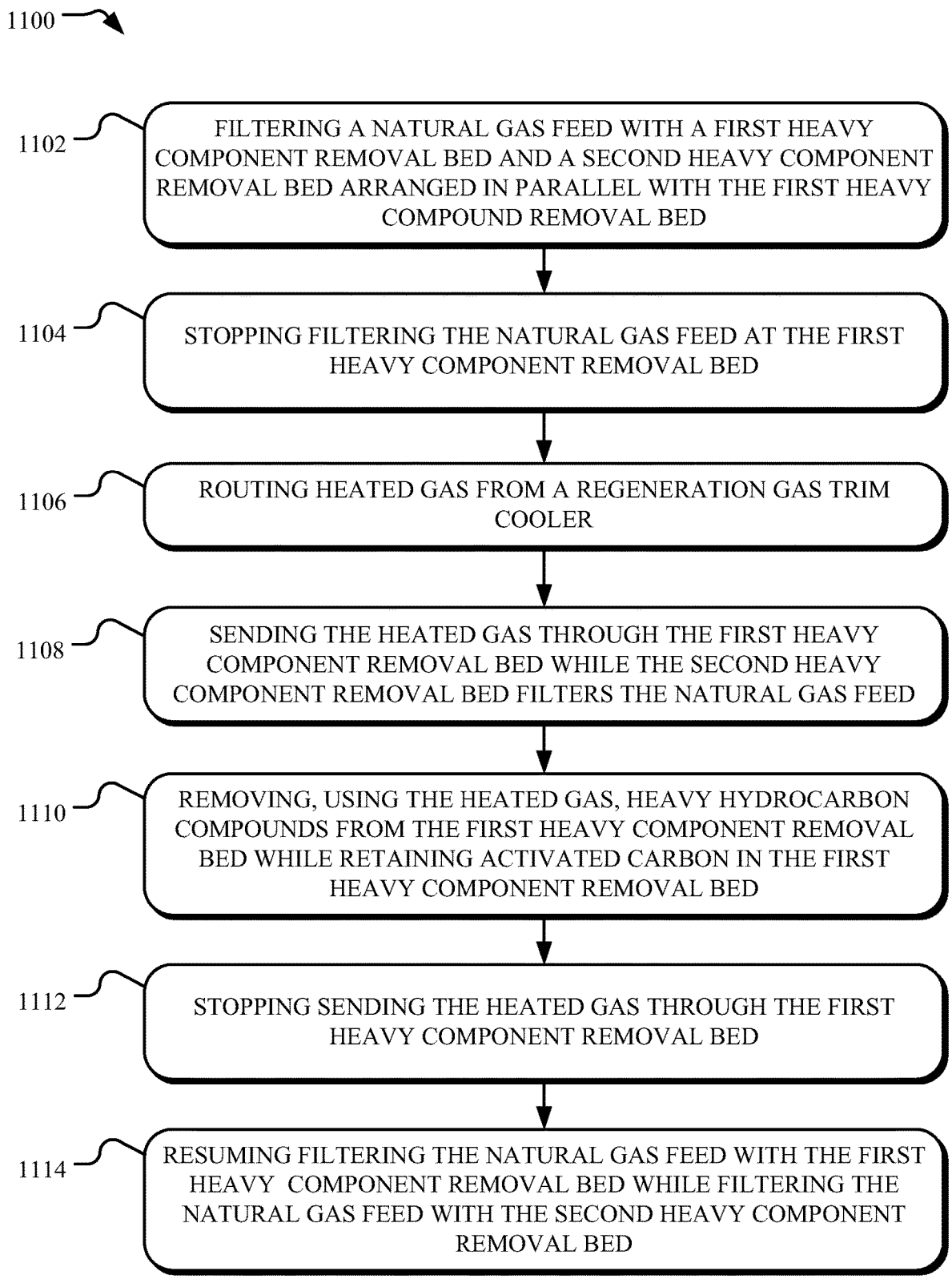
FIG. 9 illustrates example operations for regenerating a heavy hydrocarbon contaminant removal bed and removing contaminants in LNG production.

FIG. 9 illustrates an example method 1100 that may be performed by any of the systems discussed herein to regenerate the heavy component removal beds 428. At step 1102, the method 1100 may include filtering a natural gas feed with at least the first heavy compound removal bed 700 and the second heavy compound bed 702 arranged in parallel with the first heavy compound removal bed 700. At step 1104, the method 1100 may include stopping filtering the natural gas feed at the first heavy compound removal bed 700. At step 1106, the method 1100 may include routing heated gas from the regeneration gas trim cooler 430. At step 1108, the method 1100 may include sending the heated gas through the first heavy compound removal bed 700 while the second heavy compound removal bed 702 filters the natural gas feed. At step 1110, the method 1100 may include removing, using the heated gas, heavy hydrocarbon compounds from the first heavy compound removal bed 700 while retaining activated carbon in the first heavy compound removal bed 700. At step 1112, the method 1100 may include stopping sending the heated gas through the first heavy compound removal bed 700. At step 1114, the method 1100 may include resuming filtering the natural gas feed with the first heavy compound removal bed 700 while filtering the natural gas feed with the second heavy compound removal bed 702. As such, the heavy component removal beds 428 may be regenerable while staying online. In some instances, other sorbent beds, such as the set of sorbent beds 424 may not be regenerable while staying online (e.g., may be "non-regenerable").

It is understood that the specific order or hierarchy of steps in the methods depicted in FIGS. 6-9 are instances of example approaches and can be rearranged while remaining within the disclosed subject matter. For instance, any of the steps depicted in FIGS. 6-9 may be omitted, repeated, performed in parallel, performed in a different order, and/or combined with any other of the steps depicted in FIGS. 6-9.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A method for removing contaminants during liquid natural gas processing, the method comprising:
   introducing a natural gas feed into a first set of beds, the first set of beds co-loaded with a metal sulfide sorbent and a metal oxide sorbent;
   creating a partially filtered natural gas feed by removing first contaminants from the natural gas feed using the first set of beds;
   outputting the partially filtered natural gas feed to a second set of beds, the second set of beds disposed downstream from the first set of beds and loaded with activated carbon;
   creating a filtered natural gas feed by removing second contaminants from the partially filtered natural gas feed using the second set of beds; and
   outputting the filtered natural gas feed to one or more of a natural gas liquid stabilizer, a liquefaction cooler, and a regeneration gas heater.

2. The method of claim 1, wherein the first contaminants are mercury or mercury compounds and are adsorbed by the metal sulfide sorbent.

3. The method of claim 1, wherein the first contaminants are arsenic or arsenic compounds and are adsorbed by the metal oxide sorbent.

4. The method of claim 1, wherein the second contaminants are adsorbed by the activated carbon.

5. The method of claim 1, wherein the first set of beds are upstream from one or more molecular sieve dehydrators and the second set of beds are downstream from the one or more molecular sieve dehydrators.

6. The method of any of claim 1, wherein the first set of beds are non-regenerable sorbent beds.

7. The method of claim 1, wherein the second set of beds are regenerable and configured to stay online for liquid natural gas processing.

8. The method of claim 1, further comprising:
   receiving, from the first set of beds, the partially filtered natural gas feed at a heat exchanger; and
   directing a temperature controlled partially filtered natural gas feed from the heat exchanger and to the second set of beds.

9. The method of claim 1, further comprising:
   receiving, from the first set of beds, the partially filtered natural gas feed at one or more molecular sieve dehydrators; and
   directing a dehydrated partially filtered natural gas feed from the one or more molecular sieve dehydrators to the second set of beds.

10. The method of claim 1, further comprising:
    co-loading one or more molecular sieve dehydrators with a 3A or 4A molecular sieve and a 3A sieve impregnated with silver;
    arranging the one or more molecular sieve dehydrators upstream from the first set of beds;
    filtering using, the one or more molecular sieve dehydrators, the partially filtered natural gas feed to create a dehydrated and partially filtered natural gas feed; and
    directing the dehydrated and partially filtered natural gas feed to the second set of beds.

11. The method of claim 1, further comprising co-loading the activated carbon in the first set of beds.

12. The method of claim 11, wherein the first set of beds comprises a first set of sorbent beds and a second set of sorbent beds, the method further comprising;
    co-loading the second set of sorbent beds with the metal sulfide sorbent, the metal oxide sorbent, and the activated carbon; and
    arranging the second set of sorbent beds downstream from the first set of sorbent beds.

13. A system for removing contaminants during liquid natural gas processing, the system comprising:
    a first set of beds configured to be co-loaded with a metal sulfide sorbent and a metal oxide sorbent, the metal sulfide sorbent and a metal oxide sorbent filtering first contaminants from a natural gas feed; and
    a second set of beds configured to be loaded with activated carbon, the activated carbon filtering second contaminants from the natural gas feed, a filtered natural gas feed created by the filtering of the first contaminants and the second contaminants from the natural gas feed, the filtered natural gas feed configured to be outputted from the second set of beds to one or more of a natural gas liquid stabilizer, a liquefaction cooler, and a regeneration gas heater.

14. The system of claim 13, wherein the second set of beds is downstream from the first set of beds.

15. The system of claim 13, further comprising at least one of:
- a vapor liquid separator for providing the natural gas feed to the first set of beds;
- an acid gas removal absorber for providing the natural gas feed to the first set of beds;
- a feed gas exchanger for providing the natural gas feed to the first set of beds; or
- one or more molecular sieve dehydrators for providing the natural gas feed to the first set of beds.

16. The system of claim 13, wherein the natural gas feed comprises an overhead vapor portion provided from a vapor liquid separator to the first set of beds.

17. The system of claim 13, wherein the second set of beds includes a first compound removal bed loaded with the activated carbon.

18. The system of claim 17, wherein the second set of beds includes a second compound removal bed loaded with the activated carbon arranged in parallel with the first compound removal bed;

wherein the system further comprises:
- one or more valves arranged to isolate the first compound removal bed from the natural gas feed while maintaining a flow of the natural gas feed through the second compound removal bed; and
- one or more of a trim heater, a cooler, and a temperature-controlled heat exchanger arranged to cause heated gas to pass through the first compound removal bed when the first compound removal bed is isolated from the filtered natural gas feed.

* * * * *